(No Model.)
F. BENZINGER & H. E. GRABAU.
TRIANGULAR RULE.
No. 418,968.                    Patented Jan. 7, 1890.
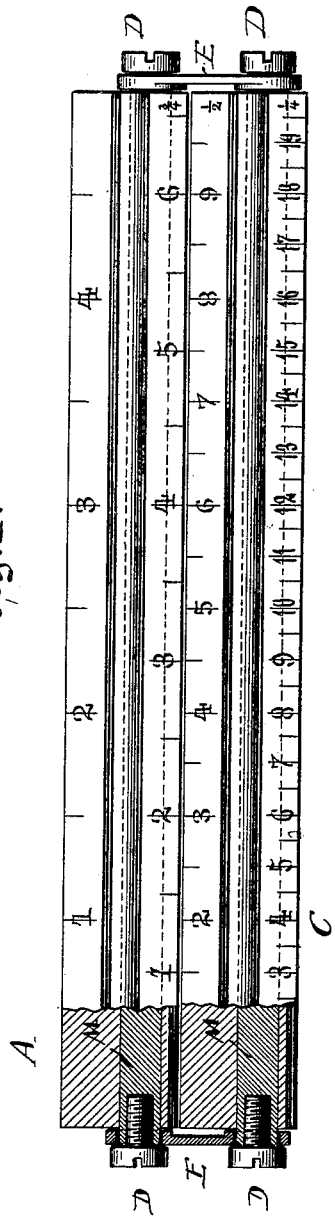
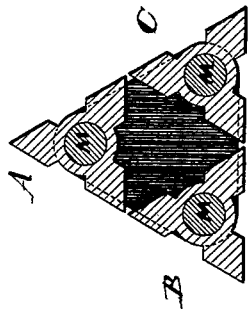
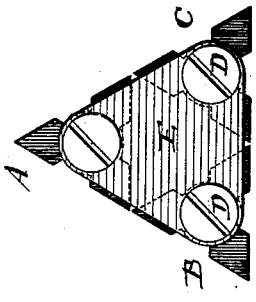
WITNESSES:
INVENTOR
Fred. Benzinger &
Hans Edgar Grabau
BY
ATTORNEYS.

UNITED STATES PATENT OFFICE.

FREDERICK BENZINGER, OF NEW YORK, N. Y., AND HANS EDGAR GRABAU, OF HOBOKEN, NEW JERSEY.

TRIANGULAR RULE.

SPECIFICATION forming part of Letters Patent No. 418,968, dated January 7, 1890.

Application filed September 26, 1889. Serial No. 325,204. (No model.)

*To all whom it may concern:*

Be it known that we, FREDERICK BENZINGER, of the city, county, and State of New York, a citizen of the United States, and HANS EDGAR GRABAU, of the city of Hoboken, county of Hudson, and State of New Jersey, a citizen of the Empire of Germany, have invented certain new and useful Improvements in Combination-Rules, of which the following is a specification.

Architects, engineers, and draftsmen use rules having various kinds of scales; and the object of our invention is to provide a combination-rule in which the different scales generally used are united in a convenient manner.

The invention consists in the combination, with end pieces, of three rules of triangular cross-section pivoted between said end pieces in such a manner that the three rules together form a body having the cross-section of an equilateral triangle.

The invention also consists in the construction and combination of parts and details, as will be fully described hereinafter, and finally be pointed out in the claims.

In the accompanying drawings, Figure 1 is a longitudinal view of our improved combination-rule, parts being broken out and others in section. Fig. 2 is an end view of the same, and Fig. 3 is a vertical transverse sectional view of the same.

Similar letters of reference indicate corresponding parts.

The three rules A, B, and C each have a cross-section in the shape of an equilateral triangle, and said three rules are pivoted by means of screws D between two equilateral triangular end pieces E, the pivot-screws D being arranged at the corners of said end pieces. The rules A, B, and C are so pivoted and arranged that when their corresponding sides are parallel and in the same planes they form a body the cross-section of which is an equilateral triangle, as shown in Figs. 2 and 3. If the two lower rules rest on the table or horizontal support, the top rule can be turned independently of the lower rules, and thus adjusted to bring any one scale into proper position for using it. As each rule contains six scales, our combination-rule contains eighteen scales, and if the rules are so arranged as to contain one scale at each end the combination-rule will contain thirty-six scales. For example, the rule A can have scales in which the inch is divided into halves, quarters, eighths, sixteenths, thirty-seconds, and sixty-fourths. The rule B may have scales in which the inch is divided on the decimal system, and the rule C may have scales on the meter system.

Any one of the rules can be brought into the most convenient position by simply turning the entire device. The top rule—that is, the one being used—can easily be so turned that the side bearing the scale used will be in a horizontal position or slightly-inclined position, thus making it very convenient for the draftsman. Furthermore, comparing scales of two different kinds is greatly facilitated by the use of our combination-rule—for example, if the instrument is so placed that the rules A and C are adjacent to each other, assuming that the rule A contains the scales in which the inch is divided into halves, quarters, &c., and the rule C contains meter measure, said two dimensions on the two different scales can easily be compared, and dimensions can be converted from the sizes on one scale into sizes on another scale in a very short time. The rules are preferably provided with a core or filling-piece M, into which the pivot-screws D may be screwed. Said pulling-piece or core is described in our application, Serial No. 325,202, filed September 26, 1889, and we do not claim it in this application.

Having thus described our invention, we claim as new and desire to secure by Letters Patent—

1. A combination-rule consisting of three rules having a triangular cross-section and pivoted between two end pieces, substantially as set forth.

2. The combination, with three rules of triangular cross-section, of triangular end pieces, between which said three rules are pivoted, the pivots passing through the triangular end pieces at the angles thereof, substantially as set forth.

In testimony that we claim the foregoing as our invention we have signed our names in presence of two subscribing witnesses.

FRED. BENZINGER.
HANS EDGAR GRABAU.

Witnesses:
OSCAR F. GUNZ,
W. REIMHERR.